(12) United States Patent
Yan et al.

(10) Patent No.: US 9,319,117 B2
(45) Date of Patent: Apr. 19, 2016

(54) CODEWORD FEEDBACK METHOD AND RECEIVER

(71) Applicant: Huawei Technologies Co., Ltd., Shenzhen (CN)

(72) Inventors: Hua Yan, Shenzhen (CN); Tingjian Tian, Shenzhen (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/677,402

(22) Filed: Apr. 2, 2015

(65) Prior Publication Data

US 2015/0215012 A1 Jul. 30, 2015

Related U.S. Application Data

(63) Continuation of application No. PCT/CN2013/073606, filed on Apr. 2, 2013.

(30) Foreign Application Priority Data

Oct. 12, 2012 (CN) .......................... 2012 1 0387324

(51) Int. Cl.
*H04B 7/04* (2006.01)
*H04B 7/06* (2006.01)

(52) U.S. Cl.
CPC ............ *H04B 7/0417* (2013.01); *H04B 7/0456* (2013.01); *H04B 7/0482* (2013.01); *H04B 7/06* (2013.01); *H04B 7/0689* (2013.01)

(58) Field of Classification Search
USPC .......... 375/267, 259, 260; 370/338, 336, 328, 370/252
See application file for complete search history.

(56) References Cited

U.S. PATENT DOCUMENTS

| | | | |
|---|---|---|---|
| 8,073,069 B2 * | 12/2011 | Mundarath et al. ........... 375/267 |
| 8,503,560 B2 * | 8/2013 | Khan et al. .................... 375/267 |
| 8,654,878 B2 * | 2/2014 | Choi et al. .................... 375/267 |
| 2008/0080449 A1 | 4/2008 | Huang et al. | |
| 2008/0095258 A1 | 4/2008 | She et al. | |

(Continued)

FOREIGN PATENT DOCUMENTS

| | | |
|---|---|---|
| CN | 101166052 A | 4/2008 |
| CN | 102036396 A | 4/2011 |

(Continued)

*Primary Examiner* — Eva Puente
(74) *Attorney, Agent, or Firm* — Leydig, Voit & Mayer, Ltd.

(57) ABSTRACT

Embodiments of the present invention disclose a codeword feedback method and a receiver, which relate to the field of communication technologies. The method includes: determining a precoding type used for downlink signal transmission, or receiving codebook indication signaling transmitted by a transmitter; selecting a codebook according to the precoding type, or selecting a codebook according to the codebook indication signaling; and selecting a codeword according to the codebook, and feeding back the codeword to the transmitter. The present invention can provide a new feedback mechanism for channel state information and a non-linear precoding codebook when needing to use both linear precoding and non-linear precoding, so that a communication system can select an appropriate precoding codebook to feed back state information according to different needs, thereby improving the performance of the communication system.

9 Claims, 3 Drawing Sheets

(56) References Cited

U.S. PATENT DOCUMENTS

| | | | |
|---|---|---|---|
| 2010/0172256 A1* | 7/2010 | Mallik et al. | 370/252 |
| 2010/0202553 A1* | 8/2010 | Kotecha et al. | 375/267 |
| 2010/0232525 A1* | 9/2010 | Xia et al. | 375/259 |
| 2011/0033010 A1 | 2/2011 | Kwon et al. | |
| 2011/0075752 A1* | 3/2011 | Zheng et al. | 375/267 |
| 2014/0146904 A1 | 5/2014 | Onodera et al. | |
| 2014/0204841 A1* | 7/2014 | Ruiz Delgado et al. | 370/328 |
| 2014/0233540 A1* | 8/2014 | Farmanbar et al. | 370/336 |
| 2014/0301383 A1* | 10/2014 | Sohn et al. | 370/338 |

FOREIGN PATENT DOCUMENTS

| | | |
|---|---|---|
| CN | 102415000 A | 4/2012 |
| CN | 102545984 A | 7/2012 |
| WO | WO 2008043817 A1 | 4/2008 |
| WO | WO 2011080774 A1 | 7/2011 |
| WO | WO 2011146606 A1 | 11/2011 |
| WO | WO 2012060237 A1 | 5/2012 |

* cited by examiner

CODEWORD FEEDBACK METHOD AND RECEIVER

CROSS-REFERENCE TO RELATED APPLICATIONS

This application is a continuation of International Patent Application No. PCT/CN2013/073606, filed Apr. 2, 2013, which claims priority to Chinese Patent Application No. 201210387324.6, filed Oct. 12, 2012, both of which are hereby incorporated by reference in their entireties.

TECHNICAL FIELD

The present invention relates to the field of communication technologies and, in particular, to a codeword feedback method and a receiver.

BACKGROUND

In current wireless communication systems such as an LTE (Long Term Evolution), MIMO (Multiple Input Multiple Output) technologies have been widely used. In the MIMO technologies, precoding is an important step, and a precoding process is a process for mapping transmitted data to transmitting antennas in a certain manner, of which the purpose lies in enabling a terminal to acquire better received signal quality via such processing. In an application scenario of the MIMO, one of the functions of the precoding is to decrease signal interferences between users. A conventional precoding scheme can be divided into two types: linear precoding and non-linear precoding. The precoding process is completed at a base station side, and most precoding schemes require the base station to acquire downlink channel state firstly, and then utilize the downlink channel state to complete a precoding operation.

When acquiring the downlink channel state, the operating mode of a communication system, including a TDD (Time Division Duplexing) mode and an FDD (Frequency Division Duplexing) mode needs to be considered. In the TDD mode, as long as a time interval between uplink and downlink is less than channel coherence time, the base station can acquire downlink channel state according to estimated uplink channel state, but that's not to say that the downlink channel state can be acquired according to the estimated uplink channel state as long as in the TDD mode. When unable to acquire the downlink channel state according to the estimated uplink channel state, a method for acquiring downlink channel state in the TDD mode is the same as a method for acquiring downlink channel state in the FDD mode. In the FDD mode, a downlink channel needs to be measured via a terminal side, and a codeword which best represents estimated results of the downlink channel state is selected from a predesigned codebook according to measurement results, where one codebook consists of limited codewords and each codeword represents a class of downlink channel state. An index of the selected codeword is fed back to a base station, the base station selects the same codeword in the same codebook according to the codeword index, and utilizes the codeword to complete a precoding operation.

At least the following problems exist in the prior art: in the current LTE system, there is only a codebook for the linear precoding scheme, and there is no codebook for the non-linear precoding scheme. When the system needs to have both precoding schemes simultaneously, the base station cannot acquire a corresponding codeword according to different precoding schemes, and cannot acquire state information of the downlink channel.

SUMMARY

Embodiments of the present invention provide a codeword feedback method and a receiver, which can solve the problem that a base station cannot acquire downlink channel state information according to different precoding schemes in a communication system having both linear and non-linear precoding schemes.

In a first aspect, a codeword feedback method is provided, including:
determining a precoding type used for downlink signal transmission, or receiving codebook indication signaling transmitted by a transmitter;
selecting a codebook according to the precoding type, or selecting a codebook according to the codebook indication signaling; and
selecting a codeword according to the codebook, and feeding back the codeword to the transmitter.

The precoding type includes linear precoding and non-linear precoding, and the codebook includes a linear precoding codebook and a non-linear precoding codebook. Optionally, the non-linear precoding codebook is generated by an iterative algorithm, the iterative algorithm includes: generating training data, where the training data is obtained by performing a phase transformation to a right singular vector of a channel coefficient matrix; and processing the training data according to a nearest neighbor criterion to obtain the non-linear precoding codebook.

In a first possible implementation, the determining the precoding type used for the downlink signal transmission includes: receiving precoding type indication signaling transmitted by the transmitter, and determining the precoding type according to the precoding type indication signaling; or, determining the precoding type according to a historical precoding type or a default precoding type used for the downlink signal transmission.

Optionally, the selecting the codebook according to the precoding type includes: if the precoding type is the linear precoding, then selecting the linear precoding codebook; if the precoding type is the non-linear precoding, then selecting the non-linear precoding codebook.

Optionally, the feeding back the codeword to the transmitter includes: feeding back an index of the codeword to the transmitter, or feeding back a difference between the index of the codeword and an index of a codeword selected last time to the transmitter.

In a second aspect, a receiver is provided, including:
a processing module, configured to determine a precoding type used for downlink signal transmission, or receive codebook indication signaling transmitted by a transmitter;
a codebook selecting module, configured to select a codebook according to the precoding type, or select a codebook according to the codebook indication signaling; and
a feedback module, configured to select a codeword according to the codebook, and feed back the codeword to the transmitter.

The precoding type includes linear precoding and non-linear precoding, and the codebook includes a linear precoding codebook and a non-linear precoding codebook. Optionally, a codebook generating module is further included, which is configured to generate the non-linear precoding codebook; the codebook generating module is specifically configured to: generate training data, where the training data is obtained by performing a phase transformation to a right singular vector of a channel coefficient matrix; and process the training data according to a nearest neighbor criterion to obtain the non-linear precoding codebook.

In a first possible implementation, the processing module also includes: a first determining unit, configured to receive precoding type indication signaling transmitted by the transmitter, and determine the precoding type according to the precoding type indication signaling; a second determining unit, configured to determine the precoding type according to a historical precoding type or a default precoding type used for the downlink signal transmission.

Optionally, the codebook selecting module includes: a first selecting unit, configured to select the linear precoding codebook when the precoding type is the linear precoding; a second selecting unit, configured to select the non-linear precoding codebook when the precoding type is the non-linear precoding.

Optionally, the feedback module is also configured to: feed back an index of the codeword to the transmitter, or feed back a difference between the index of the codeword and an index of a codeword selected last time to the transmitter.

In contrast to the prior art, embodiments of the present invention allow the transmitter to perform precoding by using the corresponding codeword in the same codebook according to the codeword fed back, where the codeword fed back to the transmitter is acquired by means of receiving the signaling transmitted by the transmitter, selecting the codebook according to the signaling directly and acquiring the codeword, or by means of determining the precoding type, selecting the corresponding codebook according to the precoding type and acquiring the codeword; and meanwhile a codebook generating method applicable to the non-linear precoding scheme is used to generate the non-linear precoding codebook. The present invention can provide a new feedback mechanism for channel state information and the non-linear precoding codebook when needing to use both linear precoding and non-linear precoding, so that a communication system can select an appropriate precoding codebook to feed back state information according to different needs, thereby improving the performance of the communication system.

BRIEF DESCRIPTION OF DRAWINGS

In order to make technical solutions in embodiments of the present invention clearer, accompanying drawings used in the description of embodiments of the present invention will be briefly described hereunder. Obviously, the described drawings are merely some embodiments of present invention. For persons skilled in the art, other drawings may be obtained based on these drawings without any creative effort.

DESCRIPTION OF EMBODIMENTS

Technical solutions in embodiments of the present invention are hereinafter described clearly and comprehensively with reference to accompanying drawings in embodiments of the present invention. Obviously, the described embodiments are only a part of embodiments of the present invention, rather than all embodiments of the present invention. All other embodiments obtained by persons of ordinary skill in the art based on embodiments of the present invention without any creative effort shall fall within the protection scope of the present invention.

A transmitter in the present invention includes a NodeB (NodeB), an evolved NodeB (evolved NodeB, eNB), a home eNB (Home evolved NodeB, HeNB), a relay station (Relay Station, RS), an access point (Access Point, AP), etc. A receiver usually refers to a user equipment (User Equipment, UE), including a mobile phone, an intelligent terminal, a notebook computer, etc.

In order to make advantages of technical solutions of the present invention clearer, the present invention will be described in detail hereunder with reference to accompanying drawings and embodiments.

Embodiment 1

Figure 1:
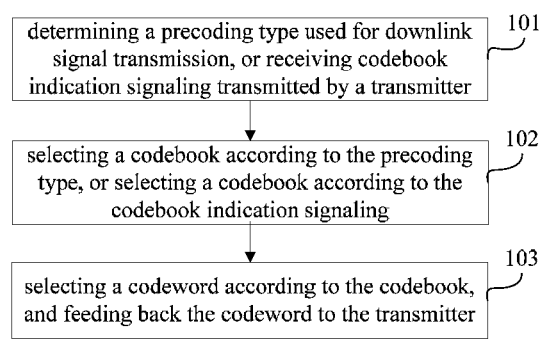
FIG. 1 is a flow chart of a method provided by Embodiment 1.

This embodiment provides a codeword feedback method, as shown in FIG. 1, the method includes:

101, Determining a precoding type used for downlink signal transmission, or receiving codebook indication signaling transmitted by a transmitter.

102, Selecting a codebook according to the precoding type, or selecting a codebook according to the codebook indication signaling.

103, Selecting a codeword according to the codebook, and feeding back the codeword to the transmitter.

The precoding type includes linear precoding and non-linear precoding, and the codebook includes a linear precoding codebook and a non-linear precoding codebook.

The non-linear precoding codebook is generated by an iterative algorithm, the iterative algorithm includes:

generating training data, where the training data is obtained by performing a phase transformation to a right singular vector of a channel coefficient matrix; and processing the training data according to a nearest neighbor criterion to obtain the non-linear precoding codebook.

Optionally, the determining the precoding type used for the downlink signal transmission includes:

receiving precoding type indication signaling transmitted by the transmitter, and determining the precoding type according to the precoding type indication signaling; or, determining the precoding type according to a historical precoding type or a default precoding type used for the downlink signal transmission.

Optionally, the selecting the codebook according to the precoding type includes:

if the precoding type is the linear precoding, then selecting the linear precoding codebook;

if the precoding type is the non-linear precoding, then selecting the non-linear precoding codebook.

Specifically, the feeding back the codeword to the transmitter includes: feeding back an index of the codeword to the transmitter, or feeding back a difference between the index of the codeword and an index of a codeword selected last time to the transmitter.

In contrast to the prior art, embodiments of the present invention allow the transmitter to perform precoding by using the corresponding codeword in the same codebook according to the codeword fed back, where the codeword fed back to the transmitter is acquired by means of receiving the signaling transmitted by the transmitter, selecting the codebook according to the signaling directly and acquiring the codeword, or by means of determining the precoding type, selecting the corresponding codebook according to the precoding type and acquiring the codeword. The present invention can provide a new feedback mechanism for channel state information and the non-linear precoding codebook when needing to use both linear precoding and non-linear precoding, so that a communication system can select an appropriate precoding codebook to feed back channel state information according to different needs, thereby improving the performance of the communication system.

Embodiment 2

Figure 2:
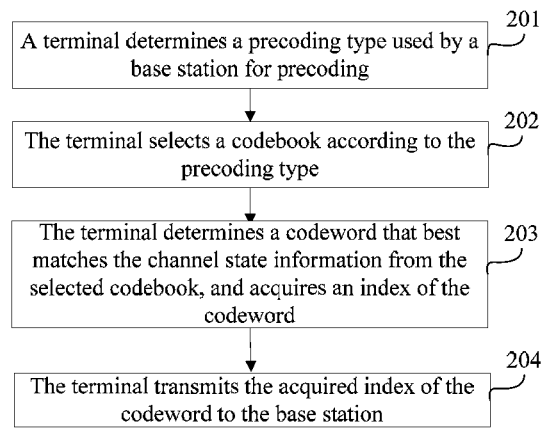
FIG. 2 is a flow chart of a method provided by Embodiment 2.

This embodiment provides a codeword feedback method, as shown in FIG. 2, the method includes:

201, A terminal determines a precoding type used by a base station for precoding.

Optionally, the terminal may select a codebook according to a historical precoding type or a default precoding type and determine the precoding type used by the base station for downlink signal transmission, and take the historical precoding type or the default precoding type as a precoding type of channel state information feedback at this time. For instance, if non-linear precoding is used for the latest downlink signal transmission, then the terminal needs to assume that the non-linear precoding is still used for the next signal transmission when feeding back the channel state information, and thus the channel state information is still fed back based on a non-linear precoding scheme.

Optionally, the terminal receives precoding type indication signaling issued by the base station, where the indication signaling is used for informing the terminal which kind of precoding types to select, and the terminal determines the precoding type of channel state information feedback at this time according to the indication signaling.

202, The terminal selects a codebook according to the precoding type.

For instance, if the terminal determines the precoding type as the linear precoding, then a codebook corresponding to the linear precoding is selected; if the terminal determines the precoding type as the non-linear precoding, then a codebook corresponding to the non-linear precoding is selected.

It should be noted that, there is no codebook corresponding to the non-linear precoding in the prior art, the codebook needs to be obtained through a codebook generating method provided by the present invention.

203, The terminal determines a codeword that best matches the channel state information from the selected codebook, and acquires an index corresponding to the codeword.

The codeword reflects downlink channel state, and the terminal needs to feed back it to the base station. After acquiring the downlink channel state, the base station may perform precoding according to the downlink channel state. The channel state information is obtained by the terminal by receiving and measuring a pilot signal and estimating according to the measurement results.

204, The terminal transmits the acquired index of the codeword to the base station.

Optionally, the terminal may feed back the index of the codeword to the base station directly, or the terminal feeds back the difference between the index of the codeword and an index of a codeword selected last time to the base station. The amount of the index of the codeword is generally the $N^{th}$ power of 2, for instance, 16, from 0 to 15 or from 1~16. When the terminal feeds back an index of a codeword to the base station, if the channel changes slowly, values of the indices of the codewords fed back for two consecutive times will be very close, for instance, 5 for last time and 6 for this time. Then the terminal feeds back the difference between the indices of the codewords for the two times to the base station, which may reduce the signaling overhead required for the feedback.

In contrast to the prior art, in embodiments of the present invention, the terminal takes the historical precoding type or the default precoding type as the precoding type of the present channel state information feedback according to the historical precoding type or the default precoding type and selects the codeword that matches the channel state information; or the terminal determines the codebook that should be used for feeding back the channel state information according to the precoding type indication signaling, selects the codeword that matches the channel state information from the codebook, and feeds back the codeword to the base station, so that the base station uses the corresponding codeword in the same codebook to perform precoding according to the feedback. The present invention can provide a new feedback mechanism for channel state information when the base station needs to use both linear precoding and non-linear precoding, so that a communication system can select an appropriate precoding codebook to feed back state information according to different needs, thereby improving the performance of the communication system.

Embodiment 3

Figure 3:
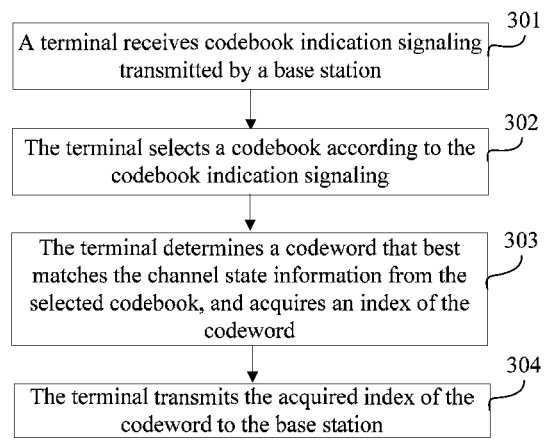
FIG. 3 is a flow chart of a method provided by Embodiment 3.

This embodiment provides a codeword feedback method, as shown in FIG. 3, the method includes:

301, A terminal receives codebook indication signaling transmitted by a base station.

302, The terminal selects a codebook according to the codebook indication signaling.

A precoding codebook that should be used by the terminal is specified in the codebook indication signaling directly, and the terminal selects a corresponding codebook according to the codebook indication signaling.

Optionally, when not receiving the codebook indication signaling, the terminal determines a codebook to be used according to the codebook used in history or the default codebook, the codebook may be a linear precoding codebook or a non-linear precoding codebook.

It should be noted that, there is no codebook corresponding to the non-linear precoding in the prior art, the codebook needs to be obtained through a codebook generating method provided by the present invention.

303, The terminal determines a codeword that best matches the channel state information from the selected codebook, and acquires an index corresponding to the codeword.

The codeword reflects downlink channel state, and the terminal needs to feed back it to the base station. After acquiring the downlink channel state, the base station may perform precoding according to the downlink channel state. The channel state information is obtained by the terminal by receiving and measuring a pilot signal and estimating according to the measurement results.

304, The terminal transmits the acquired index of the codeword to the base station.

Optionally, the terminal may feed back the index of the codeword to the base station directly, or the terminal feeds back the difference between the index of the codeword and an index of a codeword selected last time to the base station. The amount of the index of the codeword is generally the $N^{th}$ power of 2, for instance, 16, from 0 to 15 or from 1~16. When the terminal feeds back an index of a codeword to the base station, if the channel changes slowly, values of the indices of the codewords fed back for two consecutive times will be very close, for instance, 5 for last time and 6 for this time. Then the terminal feeds back the difference between the indices of the codewords for the two times to the base station, which may reduce the signaling overhead required for the feedback.

In contrast to the prior art, in embodiments of the present invention, the terminal determines the codebook to be used according to the codebook used in history or the default codebook and selects the codeword that matches the channel state information; or the terminal selects the codebook according to the codebook indication signaling, and selects the codeword that matches the channel state information from the codebook, and feeds back the codeword to the base station, so that the base station uses the corresponding codeword in the same codebook to perform precoding according to the feedback. The present invention can provide a new feedback mechanism for channel state information when the base station needs to use both linear precoding and non-linear precoding, so that a communication system can select an appropriate precoding codebook to feed back state information according to different needs, thereby improving the performance of the communication system.

Embodiment 4

Figure 4:
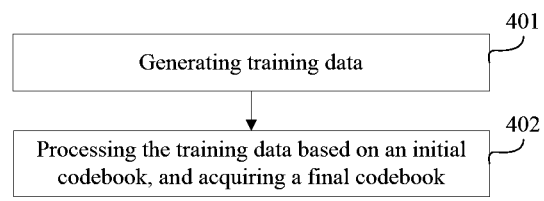
FIG. 4 is a flow chart of a method provided by Embodiment 4.

This embodiment provides a codebook generating method, as shown in FIG. 4, the method includes:

401, Generating training data.

The training data is obtained by performing a phase transformation to a right singular vector of a channel coefficient matrix. For instance, steps for generating the training data are specifically:

Selecting and running a channel model program, and obtaining the channel coefficient matrixes. For instance, the channel model program may be an SCM (Spatial Channel Model), an SCME (Spatial Channel Model Extension), an IMT-Advance (International Mobile Telecommunications-Advanced) etc. After selecting the channel model program, it is needed to configure channel parameters and run the program, and thus obtain a certain number of channel coefficient matrixes. Since the channel coefficient matrix as obtained for running the program for a single time only represents parameter configuration of this time, while the codebook needs to reflect channel states under different conditions, thus it is needed to modify the parameter configuration and run the program for many times to obtain channel matrixes under different parameter configurations. For instance, relative positions of a base station and a terminal have a close relationship with a corresponding channel coefficient matrix, while a single time running of the channel model program may be only based on a particular relative position of the base station and the terminal. In this case, the relative position relationship of the base station and the terminal should be changed, and the program should be run for several times, so that all possible relative positions of the base station and the terminal can be traversed to some extent;

Performing singular value decomposition to the channel coefficient matrix, and selecting first right singular vectors corresponding to the number of streams of a target codebook, where the number of the selected right singular vectors equals to the number of streams.

$$v_n^i = \begin{bmatrix} v_n^i(1) \\ v_n^i(2) \\ \vdots \\ v_n^i(N_T) \end{bmatrix}$$

is used to represent the $i^{th}$ right singular vector of the $n^{th}$ channel coefficient matrix, where $v_n^i(j)$ represents the $j^{th}$ component of $v_n^i$, $N_T$ represents the number of transmitting antennas, and i ranges from 1 to the number of streams;

Performing a phase rotation to the first right singular vectors, where the number of the first right singular vectors equals to the number of streams, and obtaining a phase-rotated vector: $x_n^i = v_n^i \cdot e^{-j \cdot Arg[v_n^i(1)]}$, where $Arg[v_n^i(1)]$ represents an argument of the complex number $v_n^i(1)$. The purpose of this step is to convert the first element of each singular vector into a positive real number, making all eigenvectors have a same reference phase. The reason for this is that: on one hand, the phase of an eigenvector has no effect on the non-linear precoding, and there is no need to retain information thereof; on the other hand, since addition of the training data will occur in the codebook generating algorithm, if reference phases between the training data are different, results after the addition will be affected. For instance, if opposite phases are superimposed over two originally close training data respectively, then results of addition will be close to 0, and the codebook generating algorithm will be invalid. Training data $x=[x_1 \ldots x_N]$ is obtained according to the phase-rotated vectors, where the $n^{th}$ training data may be indicated as $x_n=[x_n^1 \ldots x_n^L]$, where L is the number of streams, and the training data is a matrix of $N_T \times L$.

402, Processing the training data based on an initial codebook, and acquiring a final codebook.

For instance, a process for generating the codebook may be:

Setting an initial codebook. The size of the initial codebook is the same as that of the target codebook, where the size of the target codebook is custom-set. For instance, let the number of iterations k=0, and $y^{(k)}=[y_1^{(k)}, y_2^{(k)}, \ldots, y_M^{(k)}]$ is used to indicate a current codebook, $y_i^{(k)}$ represents a codeword in the codebook, and M represents the total size of the codebook.

Dividing each training data to a cell that is represented by a codeword in the initial codebook according to a nearest neighbor criterion. As represented, $$R_i^{(k)} = \left\{ x \mid d(x, y_i^{(k)}) = \min_{1 \leq m \leq M} d(x, y_m^{(k)}), x \in X \right\},$$

where $y_m^{(k)}$ represents the $m^{th}$ codebook of the $k^{th}$ iteration, $d(x, y_m^{(k)})$ represents a certain kind of distortion measurement between the training data x and the codeword $y_m^{(k)}$, for instance, mean square error (MSE) measurement may be indicated as: $d(x, y_m^{(k)}) = \|x - y_m^{(k)}\|^2$;

Calculating the total distortion. Specifically, $$D^+ = \frac{1}{N} \sum_{i=1}^{N} \min_{1 \leq m \leq M} d(x_i, y_m^{(k)}), D^-$$

is used to represent the total distortion calculated by last iteration (if the present is the first iteration, then $D^- \to \infty$).

Calculate the degree of change of two consecutive total distortions, and compare with a predefined threshold $\epsilon(0<\epsilon<1)$, determine whether $$\left|\frac{D^- - D^+}{D^+}\right| \le \varepsilon$$

is satisfied: if satisfied, then stop iterations, the current codebook is the final codebook; if not satisfied, then continue the steps of:

Updating the codebook. Specifically, according to the cell division in the second step, for each cell, re-determine a codeword capable of representing the cell (i.e., a centroid). Assuming that $R_i^{(k)}$ indicates a cell division of the $k^{th}$ iteration, the centroid of $R_i^{(k)}$ is $$C_i = \frac{1}{\|R_i^{(k)}\|} \sum_{x \in R_i^{(k)}} x,$$

and then a column normalization is performed to $C_i$, so that a norm of each column is 1, and thus the $i^{th}$ codeword $y_i^{(k+1)}$ as updated during the $k^{th}$ iteration is obtained. The $l^{th}$ column of $y_i^{(k+1)}$ meets:

$$y_i^{(k+1)}(:,l) = C_i(:,l) \cdot \frac{1}{\|C_i(:,l)\|},$$

where $y_i^{(k+1)}(:,l)$ and $C_i(:,l)$ represent the $l^{th}$ columns of $y_i^{(k+1)}$ and $C_i$. Now the update of the codebook is completed, then the next iteration is performed. Re-perform the second step until the condition of convergence is satisfied in the third step.

The selection for the initial codebook is critical to the performance of the codebook finally acquired. Designs for the initial codebook include a random approach, a deletion approach, etc. A PNN (Pairwise Nearest Neighbor) algorithm is a deletion algorithm, which has a higher complexity but better performance. As the initial codebook, only a part of training data may be selected for calculations so as to reduce complexity. For instance, a method for setting the initial codebook may be: selecting M training data, and treating each selected training data as a codeword. After treating each selected training data as a codeword, then each codeword only includes itself within the cell. Assuming that the total number of training data is M, then the number of codewords is M at present;

traversing all codewords, and calculating distortion measurement between two codewords;

determining two codewords with the least distortion measurement, combining the codewords, and acquiring M−1 codewords. A method for combining codewords is the same as the method for updating the codebook in the codebook generating method as described above, which will not be repeated herein;

determining whether M−1 is equal to the size of the target codebook, if M−1 is equal to the size of the target codebook, then treating the codebook consisting of current codewords as the initial codebook; if M−1 is not equal to the size of the codebook, then continuing to calculate the distortion measurement and combining the codewords until the number of the codewords is equal to the size of the target codebook, and treating the codebook consisting of current codewords as the initial codebook.

In contrast to the prior art, embodiments of the present invention provide the codebook generating method for the non-linear precoding scheme, thus a codebook used by the non-linear precoding scheme is acquired by generating training data and processing the training data according to a certain criterion. The codebook for the non-linear precoding scheme fills a blank in the prior art where there is only a codebook for a linear precoding scheme, thereby providing a new method for the base station to acquire downlink channel state information, and improving the performance of a communication system.

Embodiment 5

Figure 5:
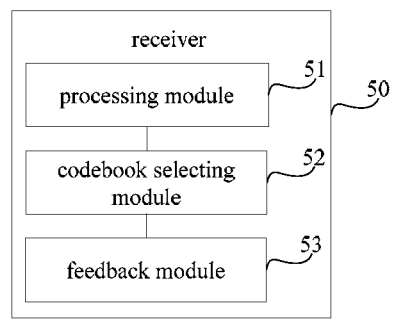
FIG. 5 and FIG. 6 are schematic structural diagrams of a receiver provided by Embodiment 5.

This embodiment provides a receiver 50, as shown in FIG. 5, the receiver 50 includes:

a processing module 51, configured to determine a precoding type used for downlink signal transmission, or receive codebook indication signaling transmitted by a transmitter;

a codebook selecting module 52, configured to select a codebook according to the precoding type, or select a codebook according to the codebook indication signaling; and a feedback module 53, configured to select a codeword according to the codebook, and feed back the codeword to the transmitter.

The precoding type includes linear precoding and non-linear precoding, and the codebook includes a linear precoding codebook and a non-linear precoding codebook.

Figure 6:
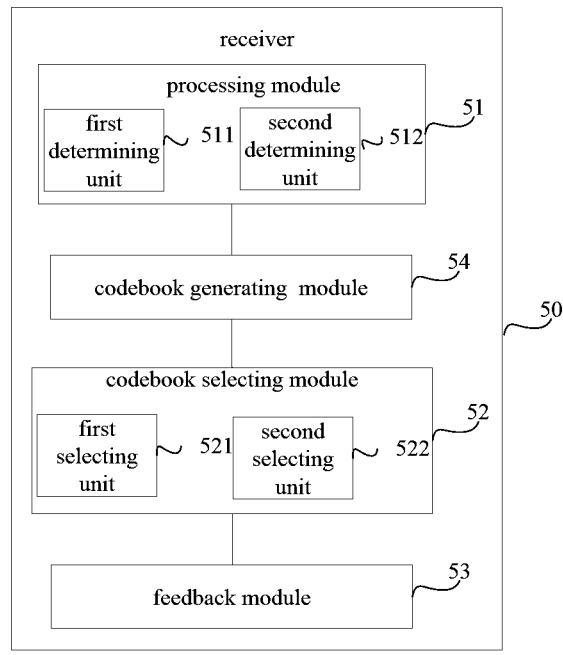

Further, as shown in FIG. 6, the receiver 50 also includes:

a codebook generating module 54, configured to generate the non-linear precoding codebook;

the codebook generating module 54 is specifically configured to: generate training data, where the training data is obtained by performing a phase transformation to a right singular vector of a channel coefficient matrix; and process the training data according to a nearest neighbor criterion to obtain the non-linear precoding codebook.

Further, as shown in FIG. 6, the processing module 51 also includes:

a first determining unit 511, configured to receive precoding type indication signaling transmitted by the transmitter, and determine the precoding type according to the precoding type indication signaling;

a second determining unit 512, configured to determine the precoding type according to a historical precoding type or a default precoding type used for the downlink signal transmission.

Further, as shown in FIG. 6, the codebook selecting module 52 includes:

a first selecting unit 521, configured to select the linear precoding codebook when the precoding type is the linear precoding;

a second selecting unit 522, configured to select the non-linear precoding codebook when the precoding type is the non-linear precoding.

Further, the feedback module 53 is also configured to:

feed back an index of the codeword to the transmitter, or feed back a difference between the index of the codeword and an index of a codeword selected last time to the transmitter.

In contrast to the prior art, embodiments of the present invention allow the transmitter to use the corresponding codeword in the same codebook to perform precoding according to the codeword fed back, where the codeword fed back to the transmitter is acquired by means of receiving the signaling transmitted by the transmitter, selecting the codebook according to the signaling directly and acquiring the codeword, or by means of determining the precoding type according to the signaling, selecting the corresponding codebook according to the precoding type and acquiring the codeword. The present invention can provide a new feedback mechanism for channel state information and the non-linear precoding codebook when needing to use both linear precoding and non-linear precoding, so that a communication system can select an appropriate precoding codebook to feed back state information according to different needs, thereby improving the performance of the communication system.

Embodiment 6

Figure 7:
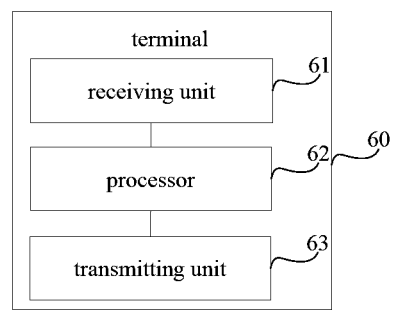
FIG. 7 is a schematic structural diagram of a terminal provided by Embodiment 6.

This embodiment provides a terminal 60, as shown in FIG. 7, the terminal 60 includes:

a receiving unit 61, configured to determine a precoding type used for downlink signal transmission, or receive codebook indication signaling transmitted by a transmitter;

a processor 62, configured to select a codebook according to the precoding type determined by the receiving unit 61, or select a codebook according to the codebook indication signaling received by the receiving unit 61; and a transmitting unit 63, configured to select a codeword according to the codebook acquired by the processor 62, and feed back the codeword to the transmitter.

The precoding type includes linear precoding and non-linear precoding, and the codebook includes a linear precoding codebook and a non-linear precoding codebook.

The processor 62 is also configured to: generate the non-linear precoding codebook;

Further, the processor 62 is specifically configured to: generate training data, where the training data is obtained by performing a phase transformation to a right singular vector of a channel coefficient matrix; and process the training data according to a nearest neighbor criterion to obtain the non-linear precoding codebook.

Further, the receiving unit 61 is also configured to:

receive precoding type indication signaling transmitted by the transmitter, and determine the precoding type according to the precoding type indication signaling; or, determine the precoding type according to a historical precoding type or a default precoding type used for the downlink signal transmission.

Further, the processor 62 is also configured to:

select the linear precoding codebook when the precoding type is the linear precoding; select the non-linear precoding codebook when the precoding type is the non-linear precoding.

Further, the transmitting unit 63 is also configured to:

feed back an index of the codeword to the base station, or feed back a difference between the index of the codeword and an index of a codeword selected last time to the base station.

In contrast to the prior art, embodiments of the present invention allow the base station to use the corresponding codeword in the same codebook to perform precoding according to the codeword fed back, where the codeword fed back to the base station is acquired by means of receiving, by the terminal, the signaling transmitted by the base station, selecting the codebook according to the signaling directly and acquiring the codeword, or by means of determining the precoding type according to the signaling, selecting the corresponding codebook according to the precoding type and acquiring the codeword. The present invention can provide a new feedback mechanism for channel state information and the non-linear precoding codebook when needing to use both linear precoding and non-linear precoding, so that a communication system can select an appropriate precoding codebook to feedback state information according to different needs, thereby improving the performance of the communication system.

The codeword feedback method and the receiver provided by embodiments of the present invention can implement the method embodiments as provided. For a specific function implementation, reference may be made to descriptions in the method embodiments, which will not be repeated herein. The codebook generating method, the codeword feedback method, the device and the receiver provided by embodiments of the present invention are applicable to any system that requires a receiver to feed back a codeword to a transmitter, but is not limited thereto.

Persons of ordinary skill in the art may understand that, all or a part of the procedures of the foregoing method embodiments may be implemented by a computer program instructing relevant hardware. The program may be stored in a computer readable storage medium. When the program runs, the procedures of the foregoing method embodiments are performed. The storage medium may be a magnetic disk, an optical disc, a read-only memory (Read-Only Memory, ROM), a random access memory (Random Access Memory, RAM), etc. The foregoing descriptions are merely specific implementations of the present invention, but the protection scope of the present invention is not limited thereto. Any modification or replacement that may be readily envisaged by persons of ordinary skill in the art should fall into the protection scope of the present invention. Thus, the protection scope of the present invention should be subject to that of the appended claims.

What is claimed is:

1. A codeword feedback method, comprising:
   determining, by a receiver, a precoding type used for downlink signal transmission, wherein the precoding type is linear precoding or non-linear precoding, or receiving, by a receiver, codebook indication signaling which is transmitted by a transmitter and indicates whether a linear precoding codebook or a non-linear precoding codebook should be selected by the receiver;
   selecting, by the receiver, a codebook from the linear precoding codebook and the non-linear precoding codebook according to the precoding type, or selecting the codebook from the linear precoding codebook and the non-linear precoding codebook according to the codebook indication signaling, wherein the non-linear precoding codebook is generated through performing a phase transformation to a right singular vector of a channel coefficient matrix to generate training data and processing the training data according to a nearest neighbor criterion; and
   selecting, by the receiver, a codeword according to the codebook, and feeding back the codeword to the transmitter.

2. The method according to claim 1, wherein the determining the precoding type used for the downlink signal transmission comprises:
   receiving precoding type indication signaling transmitted by the transmitter, and determining the precoding type according to the precoding type indication signaling; or,
   determining the precoding type according to a historical precoding type or a default precoding type used for the downlink signal transmission.

3. The method according to claim 1, wherein the selecting the codebook according to the precoding type comprises:
   if the precoding type is the linear precoding, then selecting the linear precoding codebook;

if the precoding type is the non-linear precoding, then selecting the non-linear precoding codebook.

4. The method according to claim 1, wherein the feeding back the codeword to the transmitter comprises:
feeding back an index of the codeword to the transmitter, or feeding back a difference between the index of the codeword and an index of a codeword selected last time to the transmitter.

5. A receiver, comprising:
a processing module, configured to determine a precoding type used for downlink signal transmission, wherein the precoding type is linear precoding or non-linear precoding, or receive codebook indication signaling which is transmitted by a transmitter and indicates whether a linear precoding codebook or a non-linear precoding codebook should be selected by the receiver;
a codebook selecting module, configured to select a codebook from the linear precoding codebook and the non-linear precoding codebook according to the precoding type, or select a codebook from the linear precoding codebook and the non-linear precoding codebook according to the codebook indication signaling, wherein the non-linear precoding codebook is obtained through performing a phase transformation to a right singular vector of a channel coefficient matrix to generate training data and processing the training data according to a nearest neighbor criterion; and
a feedback module, configured to select a codeword according to the codebook, and feed back the codeword to the transmitter.

6. The receiver according to claim 5, also comprising:
a codebook generating module, configured to generate the non-linear precoding codebook.

7. The receiver according to claim 5, wherein the processing module also comprises:
a first determining unit, configured to receive precoding type indication signaling transmitted by the transmitter, and determine the precoding type according to the precoding type indication signaling; and
a second determining unit, configured to determine the precoding type according to a historical precoding type or a default precoding type used for the downlink signal transmission.

8. The receiver according to claim 5, wherein the codebook selecting module comprises:
a first selecting unit, configured to select the linear precoding codebook when the precoding type is the linear precoding; and
a second selecting unit, configured to select the non-linear precoding codebook when the precoding type is the non-linear precoding.

9. The receiver according to claim 5, wherein the feedback module is also configured to:
feed back an index of the codeword to the transmitter, or feed back a difference between the index of the codeword and an index of a codeword selected last time to the transmitter.

* * * * *